US011686703B2

(12) United States Patent
Saratkar et al.

(10) Patent No.: US 11,686,703 B2
(45) Date of Patent: Jun. 27, 2023

(54) AUTOMATED ANALYSIS OF ANALYTICAL GELS AND BLOTS

(71) Applicant: Quest Diagnostics Investments LLC, Secaucus, NJ (US)

(72) Inventors: Nilesh Saratkar, Secaucus, NJ (US); Stanley Naides, Secaucus, NJ (US); Michelle A. Cleveland, Secaucus, NJ (US)

(73) Assignee: Quest Diagnostics Investments LLC, Secaucus, NJ (US)

( * ) Notice: Subject to any disclaimer, the term of this patent is extended or adjusted under 35 U.S.C. 154(b) by 263 days.

(21) Appl. No.: 16/956,208

(22) PCT Filed: Dec. 21, 2018

(86) PCT No.: PCT/US2018/067181
§ 371 (c)(1),
(2) Date: Jun. 19, 2020

(87) PCT Pub. No.: WO2019/126693
PCT Pub. Date: Jun. 27, 2019

(65) Prior Publication Data
US 2020/0319140 A1  Oct. 8, 2020

Related U.S. Application Data

(60) Provisional application No. 62/610,078, filed on Dec. 22, 2017.

(51) Int. Cl.
*G01N 27/447* (2006.01)
*G06V 20/69* (2022.01)

(52) U.S. Cl.
CPC ..... *G01N 27/44721* (2013.01); *G06V 20/695* (2022.01); *G06V 20/698* (2022.01)

(58) Field of Classification Search
None
See application file for complete search history.

(56) References Cited

U.S. PATENT DOCUMENTS

| 4,810,348 A | 3/1989 | Sarrine et al. |
| 4,841,443 A | 6/1989 | Kakumoto et al. |

(Continued)

FOREIGN PATENT DOCUMENTS

| JP | 2013-234981 A | 11/2013 |
| WO | WO-01/31321 A2 | 5/2001 |

(Continued)

OTHER PUBLICATIONS

English machine translation of JP 2013-234981 A (Year: 2013).*
International Search Report and Written Opinion dated Mar. 20, 2019, in PCT/US2018/067181.

*Primary Examiner* — J. Christopher Ball
(74) *Attorney, Agent, or Firm* — Foley & Lardner LLP

(57) ABSTRACT

The present solution describes an automated system for analyzing analytical gels or blots, such as electrophoresis gels. The system can automatically detect the lanes within the gel and convert the lane into a feature vector that can be compared to reference datasets. Based on a comparison of the feature vector to the reference datasets, the system can automatically classify the feature vector (and the test sample in the lane) into a phenotype group.

16 Claims, 7 Drawing Sheets

(56) References Cited

U.S. PATENT DOCUMENTS

| | | |
|---|---|---|
| 5,717,602 A | 2/1998 | Kenning |
| 2004/0088762 A1 | 5/2004 | Oriedo et al. |
| 2012/0247958 A1 | 10/2012 | Updyke et al. |

FOREIGN PATENT DOCUMENTS

| | | |
|---|---|---|
| WO | WO-2015/079048 A1 | 6/2015 |
| WO | WO-2017/001597 A1 | 1/2017 |

* cited by examiner

AUTOMATED ANALYSIS OF ANALYTICAL GELS AND BLOTS

CROSS REFERENCE TO RELATED APPLICATIONS

The present application claims the benefit, under 35 USC § 119(e), of U.S. Provisional Patent Application 62/610,078, filed Dec. 22, 2017. The foregoing application is incorporated herein by reference for all purposes.

BACKGROUND OF THE DISCLOSURE

Electrophoresis is a technique to separate molecules based on size or charge. Electrophoresis analysis can include loading samples into the vertical lanes of a polyacrylamide gel. A voltage can be applied to the gel. The voltage can drive the molecules through the gel. Smaller proteins tend to move faster (and farther) than larger proteins. After a predetermined time, proteins of a similar size accumulate as bands within the lanes of the gel.

Commercial labs can run thousands of electrophoresis gels per month. The gels are generally analyzed manually by at least one clinical laboratory scientist, and typically the gels are analyzed by a second clinical laboratory scientist to confirm the reading of the first clinical laboratory scientist. Accordingly, gel electrophoresis analysis can be time consuming and labor intensive.

Commercial labs also utilize other types of gels and/or blots to separate molecules within a sample based on size, charge, pH, and any number of other physical attributes of the molecules in the sample. These methods can include western blots, northern blots, southern blot, separations of PCR amplicons, capillary gels, DNA combing gels, RFLP polymorphism analysis, and 2D gel analysis. All of these methods provide valuable analytical and diagnostic outputs, but require laborious review and individual analysis by trained scientists in order to utilize the data.

Thus, there is a clear need in the art to improve the efficiency of gel/blot analysis. The present disclosure satisfies that need.

SUMMARY OF THE DISCLOSURE

The present disclosure describes an automated system for analyzing analytical or diagnostic gels or blots, such as electrophoresis gels and western blots. The system automatically detects the lanes within the gel or blot and converts each lane into a feature vector that can be compared to a reference dataset. Based on a comparison of the feature vector to the reference dataset, the system automatically classifies the feature vector (and the test sample in the lane) into a phenotype group. The system and method described herein can enable automatic analysis of gels, which can provide for considerable improvements in efficiency when compared to manually analyzing gels.

Accordingly, in one aspect, the present disclosure provides a system for processing data from an analytical gel or blot that includes a lane detector. The lane detector can identify a plurality of lanes in a first digital image. The first digital image can include an analytical gel or blot, such as an electrophoresis gel. The system can include a feature generator to determine a lane intensity vector for each of the plurality of lanes in the first digital image. The system can include a classifier. The classifier can determine a correlation score for each of the plurality of lanes in the first digital image, and the correlation score can be based on the lane intensity vector for a respective lane of the plurality of lanes and a reference lane intensity vector. The classifier can associate a classification to each of the plurality of lanes in the first digital image based on the correlation score for the respective lane in the first digital image.

In some embodiments, the system can include an image preprocessor to convert the digital image into a grayscale image.

In some embodiments, the system can include a drift corrector. The drift corrector can normalize the lane intensity vector for each of the plurality of lanes in the first digital image. In some embodiments, the drift corrector can normalize an intensity value of the lane intensity vector for each of the plurality of lanes in the first digital image. In some embodiments, the drift corrector can normalize a position of values in the lane intensity vector for each of the plurality of lanes in the first digital image. In some embodiments, the drift corrector can normalize the lane intensity vector for each of the plurality of lanes in the first digital image with respect to a reference lane. In some implementations, the drift corrector can normalize the first digital image.

In some embodiments, the classifier can determine the correlation score for each of the plurality of lanes in the first digital image using Pearson correlation. The classification can be a phenotype. The classifier can add the lane intensity vector to a reference vector database.

In another aspect, the disclosed method can include receiving, by a first digital image, such as an image of an analytical gel or blot, from an image processor comprising one or more processors. The method can include identifying, by the image processor, a plurality of lanes in the first digital image. The method can include determining, by the image processor, a lane intensity vector for each of the plurality of lanes in the first digital image. The method can include determining, by the image processor, a correlation score for each of the plurality of lanes in the first digital image. The correlation score can be based on the lane intensity vector for a respective lane of the plurality of lanes and a reference lane intensity vector. The method can include associating, by the image processor, a classification to each of the plurality of lanes in the first digital image based on the correlation score for the respective lane in the first digital image.

In some embodiments, the method can include converting, by the image processor, the digital image into a grayscale image.

In some embodiments, the method can include normalizing, by the image processor, the lane intensity vector for each of the plurality of lanes in the first digital image. The method can include normalizing, by the image processor, an intensity value of the lane intensity vector for each of the plurality of lanes in the first digital image. The method can include normalizing, by the image processor, a position of values in the lane intensity vector for each of the plurality of lanes in the first digital image. The method can include normalizing, by the image processor, the lane intensity vector for each of the plurality of lanes in the first digital image with respect to a reference lane. The method can include normalizing, by the image processor, the first digital image.

In some embodiments, the method can include determining, by the image processor, the correlation score for each of the plurality of lanes in the first digital image using Pearson correlation. The classification can be a phenotype. The method can include adding, by the image processor, the lane intensity vector to a reference vector database.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
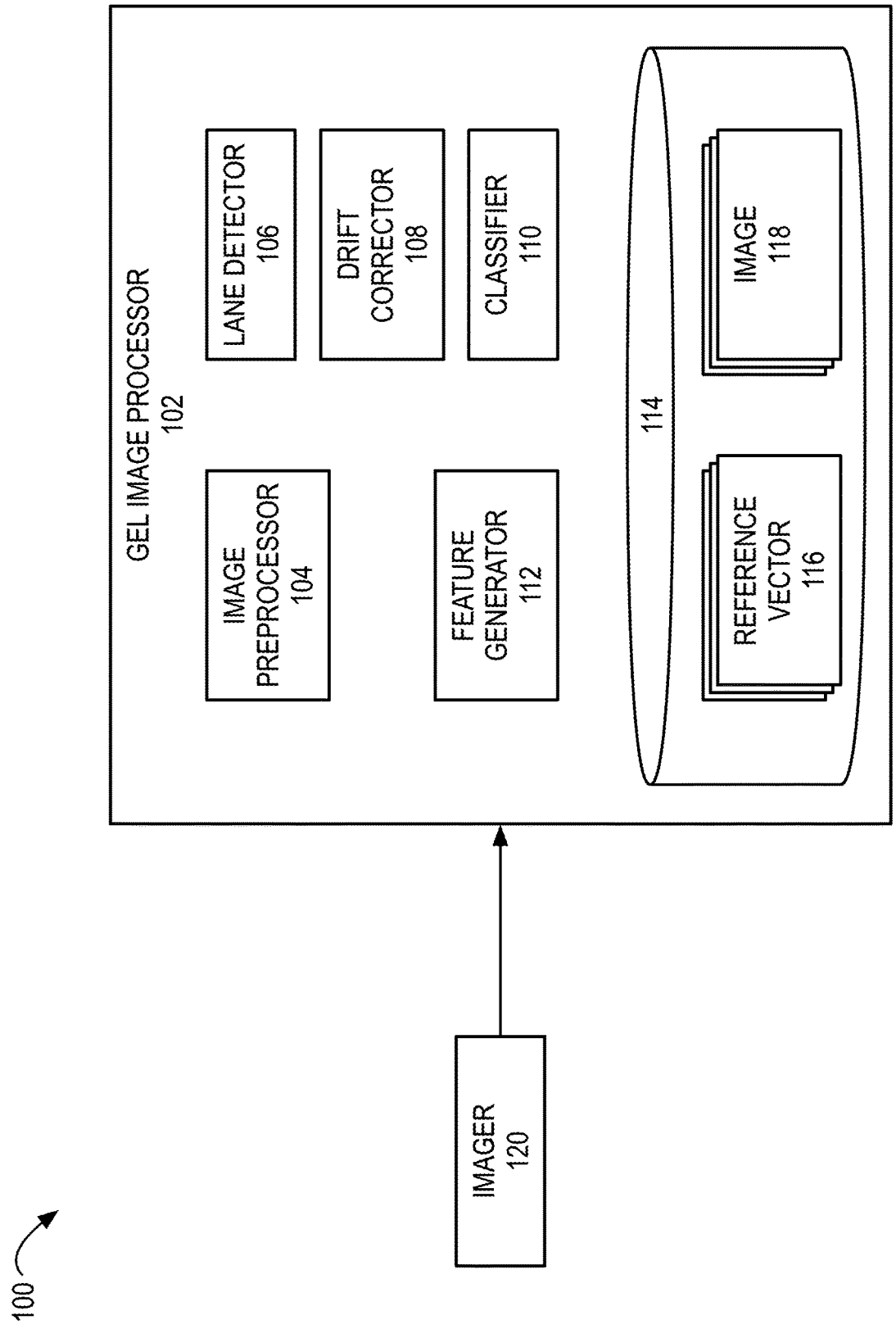
FIG. 1 illustrates a block diagram of an example system to automatically analyze analytical gels or blots.

The various concepts introduced above and discussed in greater detail below may be implemented in any of numerous ways, as the described concepts are not limited to any particular manner of implementation. Examples of specific implementations and applications are provided primarily for illustrative purposes.

The present disclosure provides systems and methods for automating the analysis of analytical gels and blots, thereby increasing the efficiency and reliability of the analysis, while decreasing the subjectivity of the analysis. Prior to the present disclosure, it was conventional industry practice for at least two human scientists to individually analyze an electrophoresis gel and make a subjective judgement call, based on the respective experience and expertise of the scientists, whether the gel met certain criteria that may be indicative of a particular diagnostic or prognostic result. Similar review and confirmation procedures were used when diagnosis or prognosis was based on alternative types of gels or blots, such as western blots. The present disclosure solves this conventional technical problem by automating the initial analysis using a system that is set up to compare a given gel or blot to a database of results that is consistently growing and expanding with each new gel/blot input. By implementing a system combining machine learning with automated analysis, the disclosed systems and methods improve the conventional analysis in a way that combines an ordered set of steps that render gel/blot information into a novel format so that it can be used in a more effective and efficient way. For instance, the manual reading of a sample may take a scientist more than 5 minutes while the system and methods disclosed can read the sample within 15 seconds.

As explained in further detail below, the disclosed systems and methods automate gel/blot analysis by taking a picture of a gel or blot, digitizing and converting the image of the gel or blot into a comparable format, and subjecting this data to a recognition modeling against a database of diagnostic and prognostic information, and interpreting the data into a phenotypic interpretation that can be used for a diagnostic or prognostic determination. For instance, use of the systems and methods described herein on 144 samples resulted in an average concordance of 98.6% when compared with manual readings. Additionally, the system reduced the time required to analyze a sample by 95% when compared to manual review of the sample.

For the purposes of the present disclosure, the gel or blot that is being analyzed is not particularly limited, so long as it is a gel or blot that can be analyzed using the disclosed recognition modeling process for providing diagnostic or prognostic information. Suitable gels/blots include, but are not limited to, electrophoresis gels, western blots, northern blots, southern blot, separation/identification of PCR amplicons, capillary gels, DNA combing gels, RFLP polymorphism analysis, methylation analysis, and 2D gel analysis.

FIG. 1 illustrates a block diagram of an example system 100 for automatically analyzing analytical gels or blots, such as an electrophoresis gel. The system 100 includes an image processor 102. The image processor 102 includes an image preprocessor 104 to perform initial processing of an image 118 that includes a gel or blot. The gel image processor 102 includes a lane detector 106, a drift corrector 108, a classifier 110, and a feature generator 112. Together, the components of the image processor 102 can analyze input images 118 to generate phenotype predictions for the input images 118. The image processor 102 can include a database 114 (or other storage device). A plurality of reference vectors 116 and digital images 118 (also referred to as images 118) can be stored in the database 114. The images 118 can be images of electrophoresis gels that are generated by scanning (or otherwise imaging) the gels or blots. The imager 120 can scan the gels or blots. The imager 120 can transmit a digitized image of the gel or blot to the image processor 102 (or other component of the image processor 102).

While the image processor 102 and the imager 120 are illustrated as separate devices, in some implementations, the image processor 102 can be a component of the imager 120 or the image processor 102 can include imaging functionality. For example, an imager 120 with a built-in image processor 102 can scan and then automatically classify the scanned.

The image processor 102 can include an image preprocessor 104. The image preprocessor 104 can be any script, file, program, application, set of instructions, or computer-executable code that is configured to enable a computing device on which the image preprocessor 104 is executed to perform image processing of an image 118. The image 118 can be a digital image of an analytical gel or blot, such as an electrophoresis gel. The image preprocessor 104 can receive the image 118 from the database 114 or the imager 120. The image preprocessor 104 can convert the image 118 into a grayscale image. For example, the pixel value vector in the RGB colorspace can be converted to an intensity value ranging from 0 to an assigned upper limit. For instance, in some embodiments black may be represented as 0 while white is represented as 1 and shades of gray are assigned a value in between. In some embodiments, the intensity value may be represented by a percentage of 0% up to 100%, with 0% being white and 100% being black. In some embodiments, grayscale images may be stored with 8, 10, 12, or 16 bits per sampled pixel, which allows from 256 up to 65,536 different levels intensities (i.e., shades of gray), respectively, to be recorded, typically on a non-linear scale. In some implementations, the image preprocessor 104 saves the grayscale version of the image 118 as a second image 118, and, in other implementations, the image preprocessor 104 replaces the original image 118 with the grayscale image 118.

The image preprocessor 104 can also perform other image processing techniques such as, but not limited to, de-skewing or rotating the image 118, resizing the image 118, down sampling the image 118, up sampling the image 118, cropping the image 118, or reducing noise or other artifacts from the image 118. For example, the image preprocessor 104 can apply a smoothing or median filter to reduce the noise in the image 118.

The image processor 102 can include a lane detector 106. The lane detector 106 can be any script, file, program, application, set of instructions, or computer-executable code that is configured to enable a computing device on which the lane detector 106 is executed to detect one or more lanes within the image 118. The gel or blot imaged in each of the images 118 can include a plurality of lanes. The lane detector 106 can locate the lanes. In some implementations, the lane detector 106 can determine the location and width of each of the lanes. The lane detector 106 can segment the image 118 into a plurality of sub-images that each contain a single lane (or other subset of the total number of lanes).

In some implementations, the lane detector 106 provides a graphical user interface to enable a user to identify the lanes within an image 118. Via the graphical user interface, a user can also modify or edit the location of lane predictions made by the lane detector 106.

In some implementations, the lane detector 106 can automatically identify the lanes in the image 118. In some implementations, when the lanes are spaced along the x-axis of the image 118, the lanes can be detected by projecting the pixel values for each column of pixels to the x-axis. Each value in the resulting vector can indicate the summed value of the pixels having a common x-axis value. For example, if the image 118 is 750 pixels tall and 1,500 pixels wide, the projection to the x-axis is a vector including 1,500 values, each value can correspond to the sum of the y-axis values at the given x-axis value. The borders of the lanes can be detected by locating the local minimums in the vector. The relative center of each lane can be identified by locating the local maximums in the vector. A given lane can also be detected based on its absolute location within an image, as the images may be formatted at a consistent size and magnification such that the absolute location of a lane or a band within a lane can be determined. In some implementations, the lane detector 106 knows before beginning the lane detection procedure the number of lanes in the image 118.

The image processor 102 can include the feature generator 112. The feature generator 112 can be any script, file, program, application, set of instructions, or computer-executable code that is configured to enable a computing device on which the feature generator 112 is executed to generate, calculate, or otherwise determine a feature vector for each of the identified lanes. In some implementations, for each lane, the feature generator 112 can identify a lane intensity vector that passes through the length of the respective lanes. The lane intensity vector can be a vector that passes through substantially the middle of each of the lanes. In some implementations, the lane intensity vector can be a vector that passes through the local maximum, as described above, for each of the lanes. In some implementations, the lane intensity vector can be assigned an absolute location, as described above, for each of the lanes. The lane intensity vector can indicate the intensity (for example, between 0 and 255) of the respective lanes along the length of the lane intensity vector.

The image processor 102 can include the drift corrector 108. The drift corrector 108 can be any script, file, program, application, set of instructions, or computer-executable code that is configured to enable a computing device on which the drift corrector 108 is executed to correct or otherwise normalize drift error present in the gel/blot or lane intensity vectors. When preparing the gel or blot that is later captured in the image 118, the molecules in the sample are separated through the application of, for example, a voltage that is applied across a gel. Typically, in each lane, smaller proteins can move faster (and thus farther) than larger proteins. However, when a sample is separated by running a voltage across a gel, the voltage can spread unevenly across the gel and can result in an uneven migration distance of similarly sized proteins in the different lanes. For example, a 500 base pair DNA fragment in a lane near the edge of the gel may travel farther than a 500 base pair DNA fragment in a lane near the middle of the gel. By the same token, protein fragments of equivalent sizes or molecular weights may travel different distances depending on the lane in which they are loaded.

The drift corrector 108 can normalize the lane intensity vectors by normalizing the lane intensity vectors to one or more reference lanes identified in the image 118. For example, mass ladders can be added to predetermined reference lanes of the gel or blot. When the voltage is applied to the reference lanes, the distance traveled by the base pairs of known length provide a reference to which the other lanes can be compared.

In some implementations, the drift corrector 108 can correct and normalize for the drift by normalizing the length of the lane intensity vector. The drift corrector 108 can shift the location of the values in the lane intensity vectors. For example, if the smallest fragment of the mass ladder traveled 500 pixels, the lane intensity vectors can be shifted or scaled to have a length of 500 values. In some implementations, the lane intensity vectors can be normalized by zero-padding the beginning or tail of the vector, adding padding between local maximums, removing values, duplicating values, or any combination thereof. In some implementations, the drift corrector 108 can normalize the magnitude of the values in the lane intensity values. For example, the magnitude of the values can be scaled between 0 and 1, between 0 and 100, between 0 and 255, or between any other predefined ranges. In some implementations, the lane intensity vectors can be normalized to an absolute location within an image.

The image processor 102 can include a classifier 110. The classifier 110 can be any script, file, program, application, set of instructions, or computer-executable code that is configured to enable a computing device on which the classifier 110 is executed to compare the lane intensity vectors to reference vectors. The classifier 110 can compare the lane intensity vectors or the normalized lane intensity vectors to the reference vectors 116. The reference vectors 116 can be stored in the database 114. A different phenotype can be associated with each of the reference vectors 116. The classifier 110 can use Pearson correlation to determine if the lane intensity vector matches a specific reference vector 116.

In some implementations, the classifier 110 can flag or otherwise indicate the lane intensity vector is a match, possible match, or not a match for a given reference vector 116. For example, if the Pearson correlation value is greater than about 0.95, the classifier 110 can determine the lane intensity vector matches the reference vector 116. If the Pearson correlation value is between about 0.90 and about 0.95, the classifier 110 can flag the lane intensity vector for further review. If the Pearson correlation is less than 0.90, the classifier 110 can flag the lane intensity vector as not a match for the reference vector 116.

Figure 2:
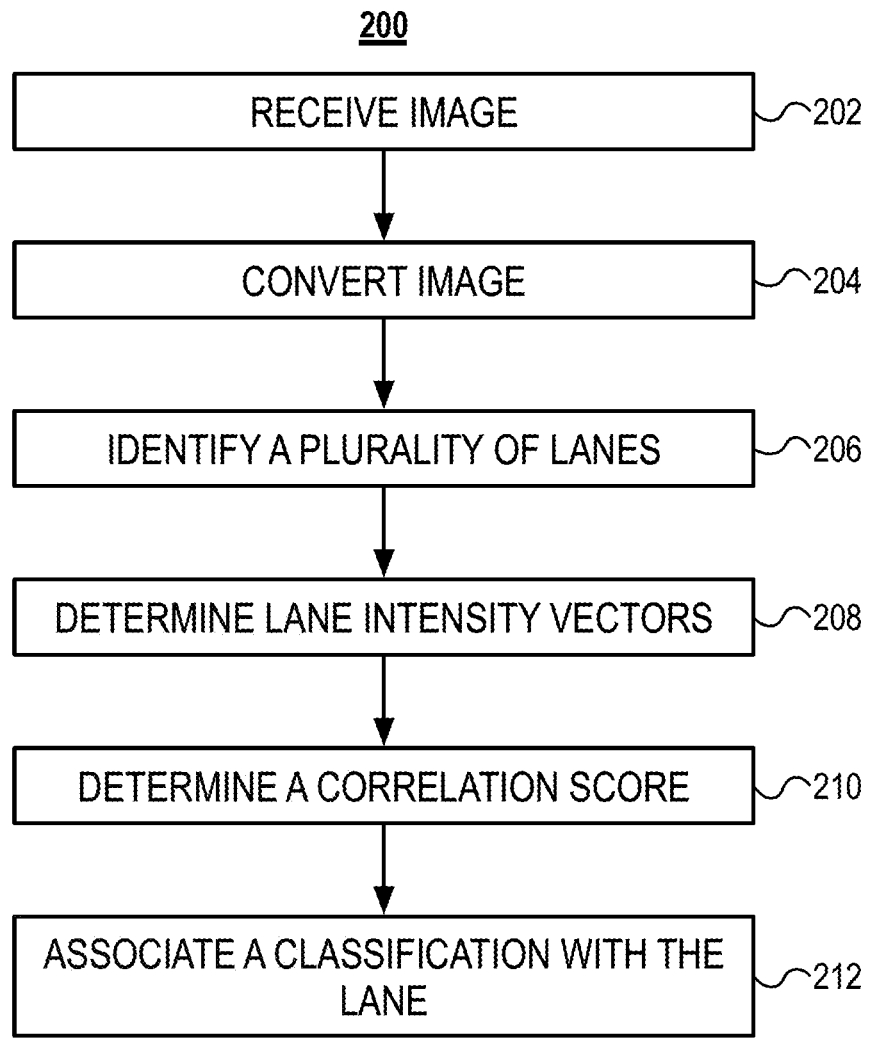
FIG. 2 illustrates a block diagram of an example method to analyze analytical gels or blots using the system illustrated in FIG. 1.

FIG. 2 illustrates a block diagram of an example method 200 to analyze analytical gels or blots using the system illustrated in FIG. 1. The method 200 can include receiving an image (BLOCK 202). The method 200 can include converting the image (BLOCK 204). The method 200 can include identifying a plurality of lanes in the image (BLOCK 206). The method 200 can include determining lane intensity vectors (BLOCK 208). The method 200 can include determining a correlation score (BLOCK 210). The method 200 can include associating a classification with the lane (BLOCK 212).

As set forth above, the method 200 can include receiving an image (BLOCK 202). Also referring to FIG. 1, the image 118 can be received from the imager 120. The image 118 can be an image of, for example, an electrophoresis gel or another type of analytical gel or blot. The image processor 102 can store the image 118 in the database 114. The method 200 can include converting the image (BLOCK 204). The image preprocessor 104 can convert the image 118 into a grayscale image. The image preprocessor 104 can also filter out noise and other artifacts by, for example, applying a smoothing filter to the image 118. The image preprocessor 104 can de-skew and crop the image 118. The converted image 118 can overwrite the original image 118 or the image preprocessor 104 can save the processed image 118 as a second image 118.

Figure 3A:
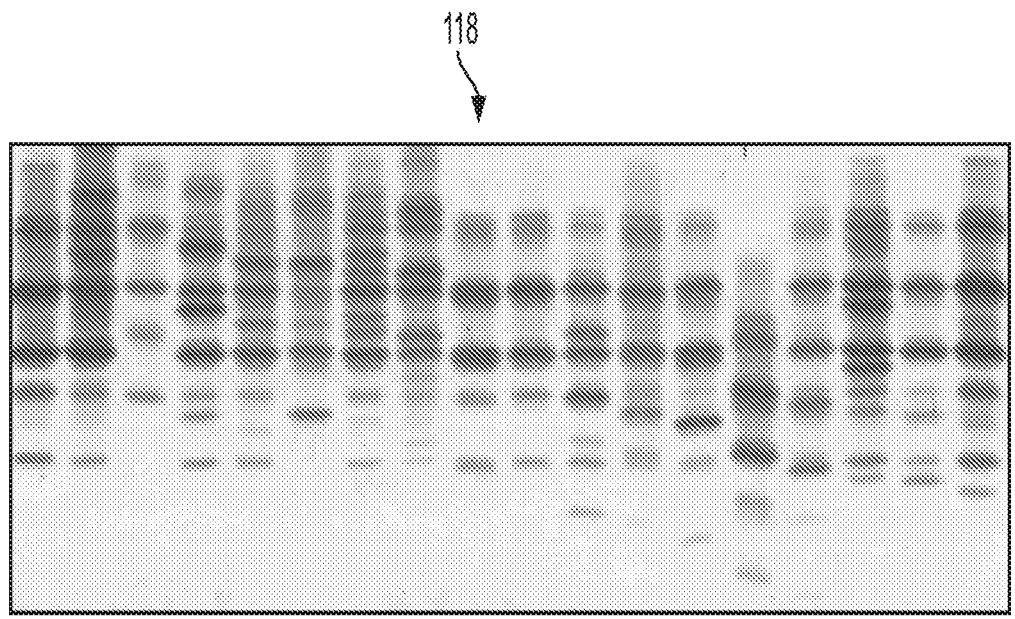
FIGS. 3A and 3B illustrate the detection of lanes using the example system illustrated in FIG. 1.
Figure 3B:
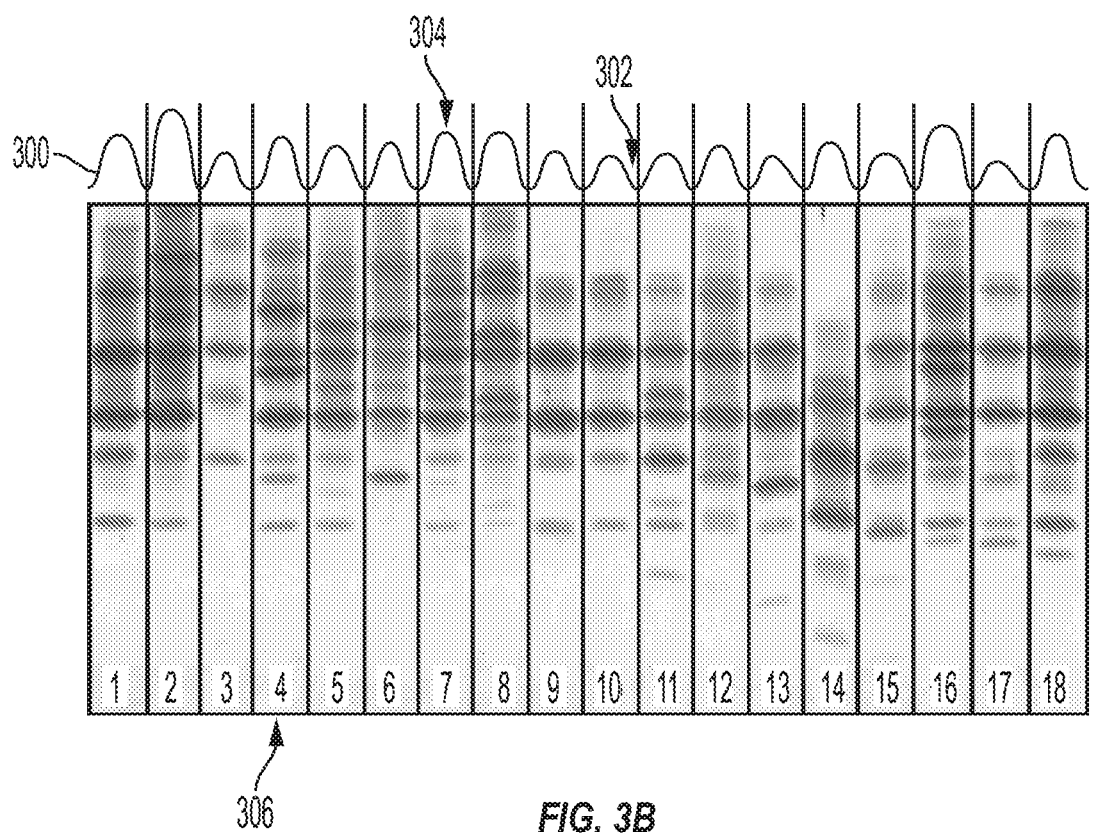

The method 200 can include identifying a plurality of lanes in the image (BLOCK 206). Also referring to FIGS. 3A and 3B, the lane detector 106 can detect the lanes of the gel or blot captured in the image 118. FIGS. 3A and 3B illustrate the detection of lanes using the example system illustrated in FIG. 1. FIG. 3A illustrates an example image 118. As described above, the lane detector 106 can detect the lanes by projecting the intensity values along each pixel column to the x-axis. The resulting vector 300 is illustrated in FIG. 3B. The lane detector 106 can separate the lanes by finding the local minima 302 between the local maxima 304. As illustrated in FIG. 3B, the lane detector 106 identified 18 lanes 306. In some implementations, the lane detector 106 can separate each of the lanes 306 into separate images 118. The lane detector 106 can store the locations of the lanes and the boarders between the lanes in the database 114.

Figure 4A:
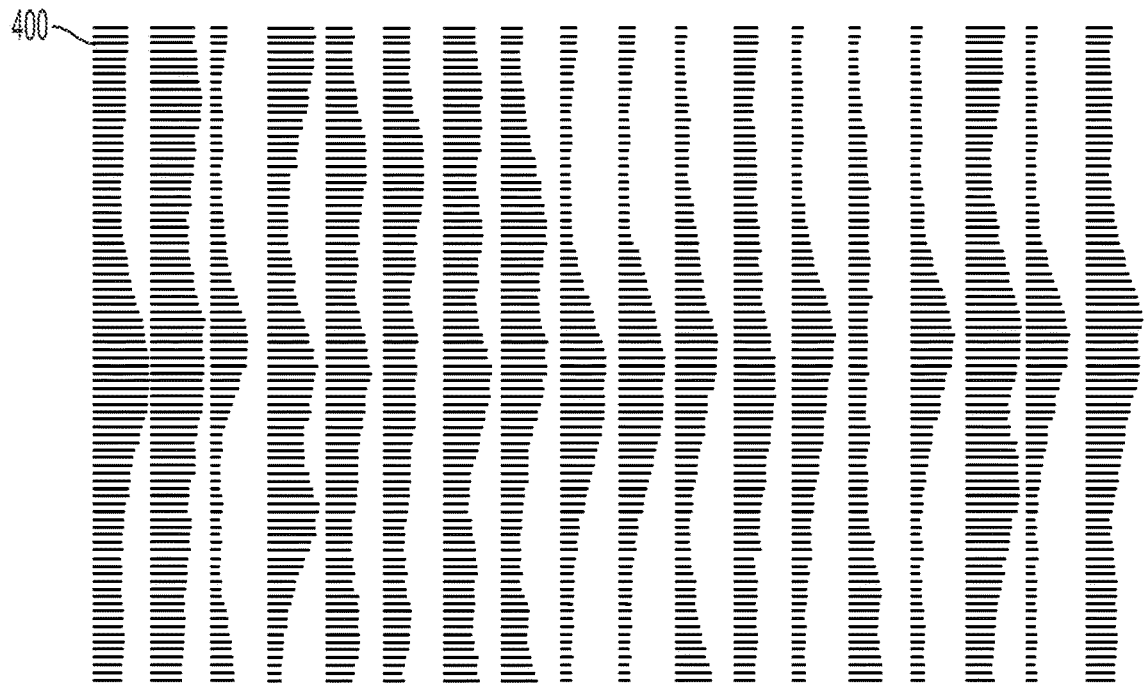
FIGS. 4A and 4B illustrate plots of example lane intensity vectors generated using the example system illustrated in FIG. 1.
Figure 4B:
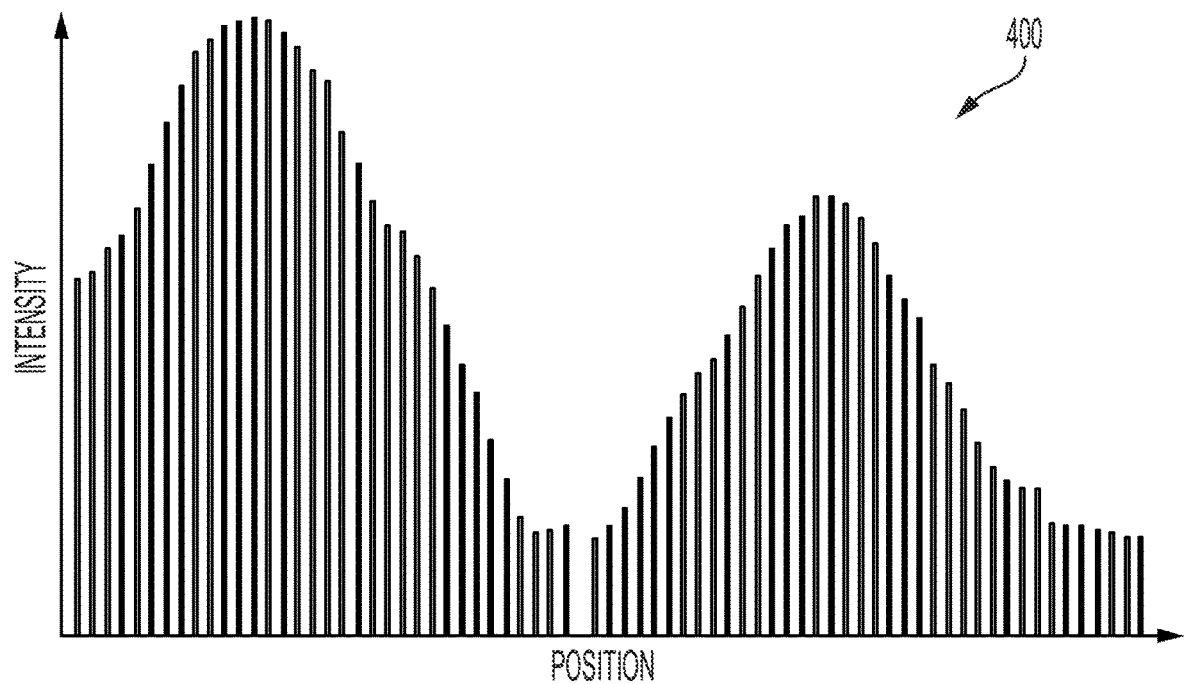

The method 200 can include detector lane intensity vectors (BLOCK 208). The feature generator 112 can generate a lane intensity vector for each (or a subset) of the lanes identified in the previous step. In some implementations, the lane intensity vector can be a vector that passes through each lane 306. The feature generator 112 can generate the lane intensity vector as a vector passing through each of the local maxima 304. FIGS. 4A and 4B illustrate plots of example lane intensity vectors generated using the example system 100 illustrated in FIG. 1. FIG. 4A illustrates a plurality of plots of different lane intensity vectors 400. The lane intensity vector 400 correspond to the lanes 306 identified in FIG. 3B. FIG. 4B illustrates single plot of an example lane intensity vector 400. The single lane intensity vector plot illustrated in FIG. 4B is rotated 90 degrees with respect to the lane intensity vector plots illustrated in FIG. 4A.

As illustrated in FIG. 4B, the x-axis corresponds to a position along the lane intensity vector 400. The y-value at each position indicates the intensity value of the pixel (or combination of pixels) in the image 118 from which the lane intensity vector 400 was generated.

Figure 5A:
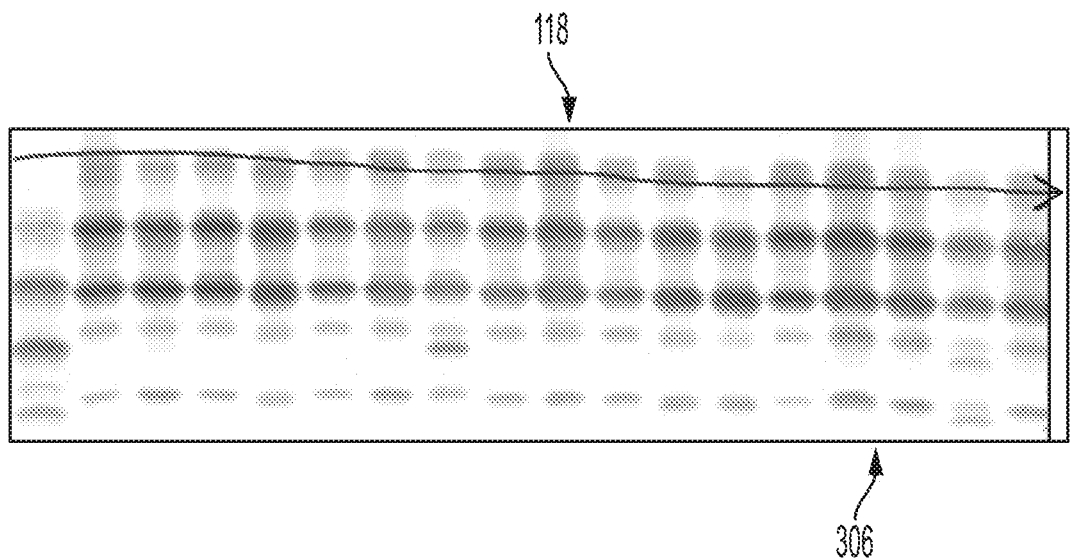
FIGS. 5A and 5B illustrate the normalization of the lane intensity vectors using the example system illustrated in FIG. 1.
Figure 5B:
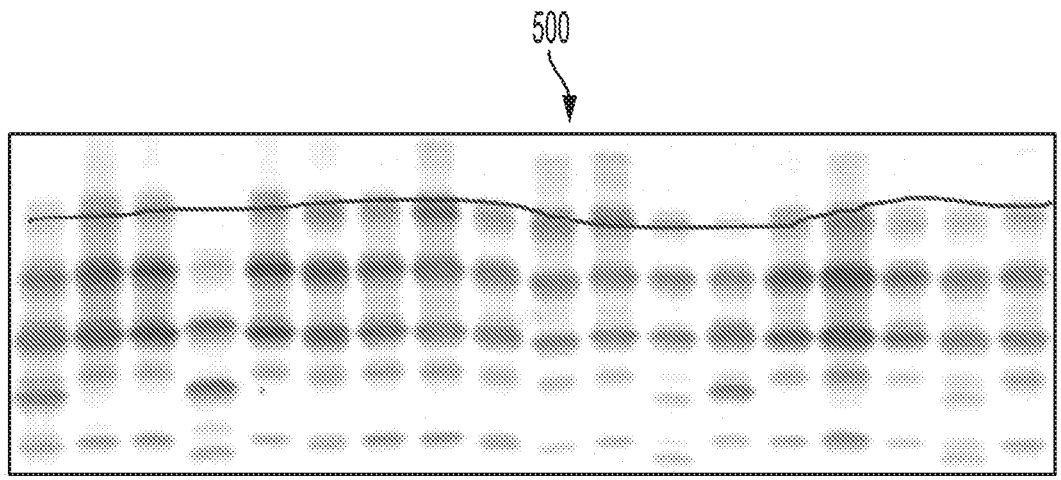

The method 200 can include normalizing the image 118 or the lane intensity vectors. For example, the drift corrector 108 can normalize the image 118 before the lane intensity vectors are generated. In other implementations, the drift corrector 108 can normalize the lane intensity vectors after they are generated by the feature generator 112. FIGS. 5A and 5B illustrate the normalization of the lane intensity vectors using the example system illustrated in FIG. 1. FIG. 5A illustrates an image 118. As illustrated, the lanes 306 shift downward from left to right. FIG. 5B illustrates a normalized image 500. In the normalized image 500, the lanes 306 are normalized such that the lanes 306 are not substantially shifted downward from left to right.

Referring to FIG. 2, the method 200 can include determining a correlation score (BLOCK 210). The classifier 110 can generate a correlation score for each of the lane intensity vectors 400. To generate the correlation score, the classifier 110 can retrieve a reference vector 116 from the database 114. The classifier 110 can calculate a correlation between the reference vector 116 and each of the respective lane intensity vectors 400. The classifier 110 can calculate the correlation score using Pearson correlation.

Figure 6A:
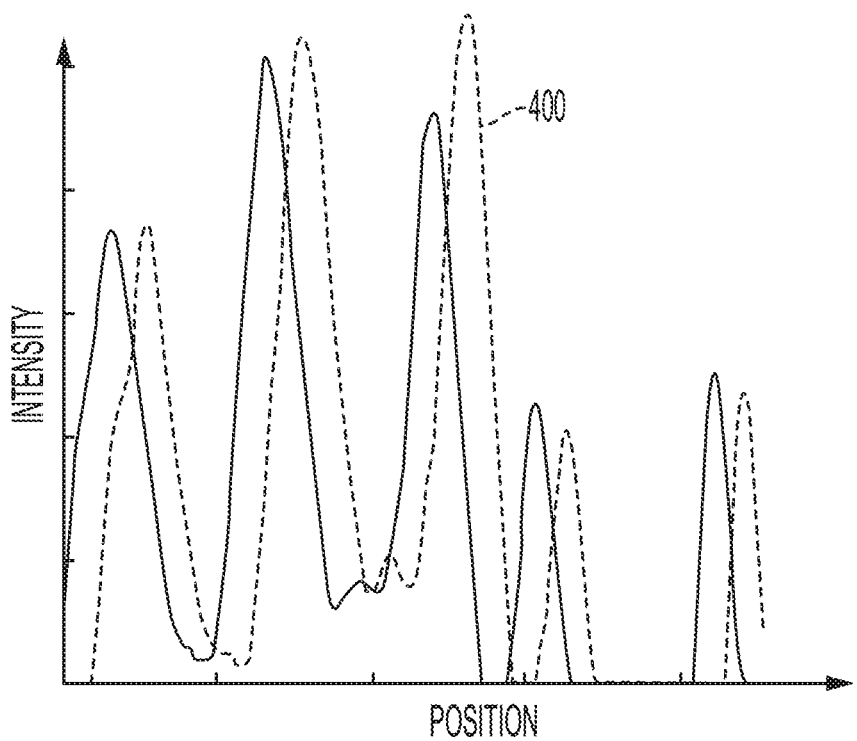
FIGS. 6A and 6B illustrate the correlation of lane intensity vectors and reference lane intensity vectors using the example system illustrated in FIG. 1.
Figure 6B:
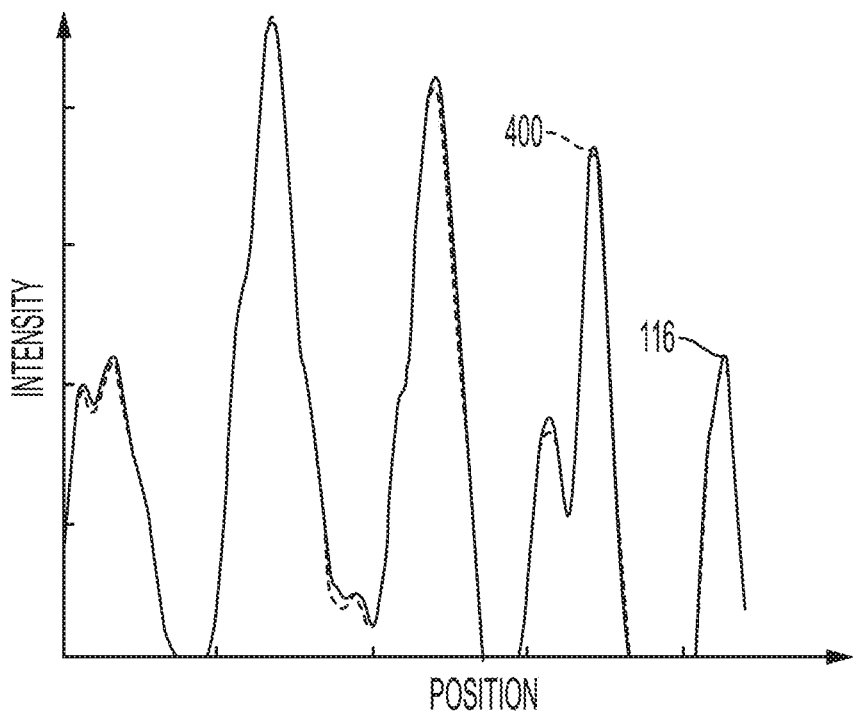

FIGS. 6A and 6B illustrate the correlation of lane intensity vectors and reference lane intensity vectors using the example system illustrated in FIG. 1. FIG. 6A illustrates a lane intensity vector 400 plotted as a line. The reference vector 116 is also plotted as a line in FIG. 6A. The classifier 110 can perform Pearson correlation on the reference vector 116 and the lane intensity vector 400 to generate a correlation score for the lane intensity vector 400. For the example reference vector 116 and lane intensity vector 400 illustrated in FIG. 6A, the classifier 110 calculated a correlation score of about 0.80.

FIG. 6B illustrates a plot of reference vector 116 and a normalized version of the lane intensity vector 400 illustrated in FIG. 6B. The drift corrector 108 can normalize the height lane intensity vector 400 and the x-axis position of the lane intensity vector values. After normalization, the classifier 110 calculated a correlation score for the lane intensity vector 400 of 0.99.

Referring to FIG. 2, the method 200 can include associating a classification with the lane intensity vector. The classification can be based on the correlation score. The classification can be a phenotype. In some implementations, the classification is that the lane intensity vector is not related to any phenotype. Each of the reference vectors 116 can be generated by processing analytical gels or blots of samples having known phenotypes. Once the reference vector 116 is generated, the reference vector 116 can be stored in the database 114 in association with an indication of the phenotype. During the method 200, if the correlation score is above about 0.95, the classifier 110 can associate the reference vector's phenotype with the input lane intensity vector. If the correlation score is between about 0.90 and about 0.95, the classifier 110 can flag the lane intensity vector (and associated image 118) for further review. If the classifier 110 determines the correlation score is below about 0.90, the classifier 110 may not associate the phenotype with the lane intensity vector. The classifier 110 can proceed to the compare the lane intensity vector to a different reference vector 116 in the database 114. In some implementations, the classifier 110 can add the lane intensity vector back to the database 114 as a new reference vector 116.

Those of ordinary skill in the art will recognize that the disclosed processes and methods may be used to evaluate or analyze multiple types of analytical gels for multiple purposes. For instance, an electrophoresis gel may be used to analyze proteins, DNA, RNA, or carbohydrates. Additionally, the disclosed methods and processes may be applicable for use with either 1D or 2D gels. Suitable gels include agarose gels, sodium dodecyl sulfate polyacrylamide gels (SDS-PAGE), starch gels, and any other known gels that can be used for electrophoresis.

Figure 7:
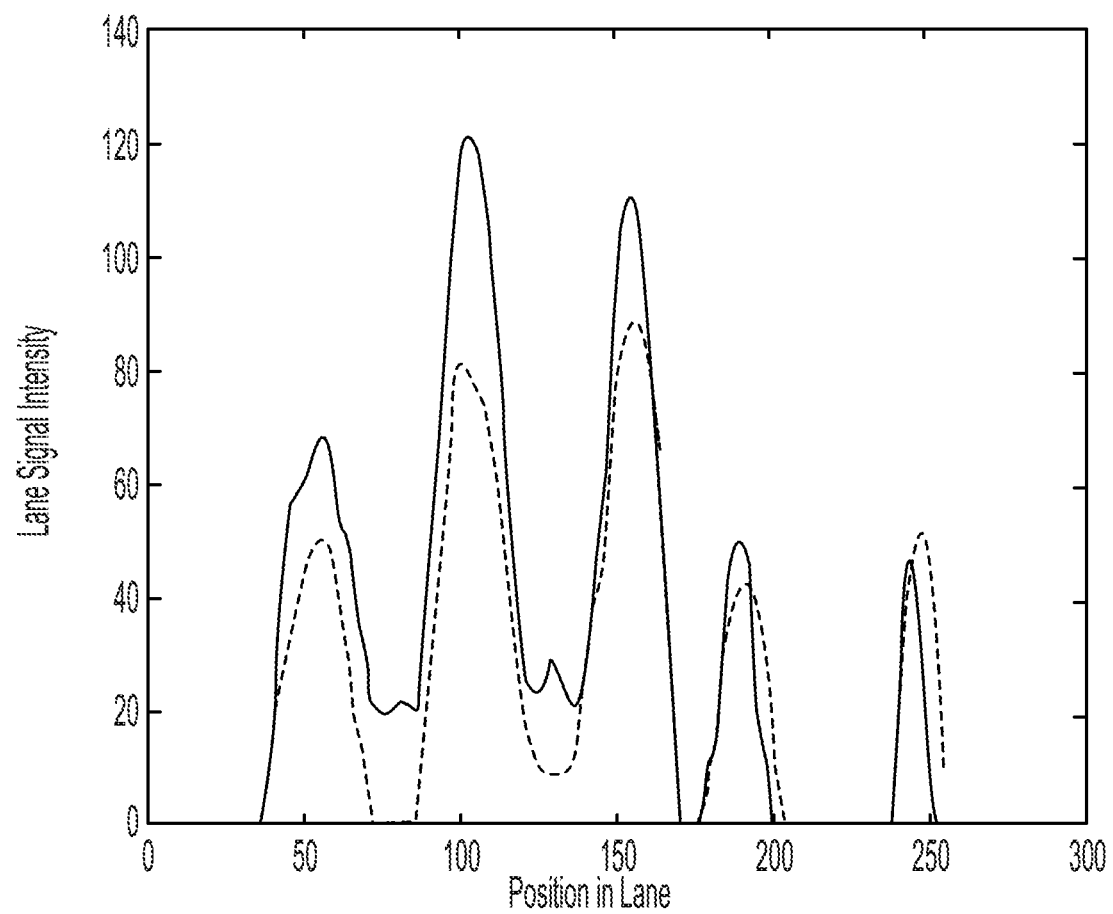
FIG. 7 illustrates an exemplary gel correlation in which the net correlation is 0.958 between a sample (Blue) and a reference (Red), while the first half of the lane has a correlation of 0.98 and the second half has a correlation of 0.932. Thus, a separate comparison of the signal from first and second half provides a better indication of how well the lane signal matches with the predicted phenotype signals from the reference.

In some embodiments, the gel or blot being analyzed may be fractured or divided prior to analysis. For example, a gel or blot may be divided in half to allow for a comparison of the signal correlation between the first and second half of the gel or blot. As shown in FIG. 7, the signal comparison of a sample lane (Blue) and a matching reference (Red) signal showed a correlation of 0.958. Dividing the gel allows the user to see that the first half of the lane correlates (0.98) better than the second half (0.932). A separate comparison of the signal from the first and second halves provides further insight into how well the lane signal of a sample matches with the predicted phenotype signals from a reference. Further, in some embodiments, a subject matter expert, such as a laboratory technician or scientist, further examine both sections of the gel/blot correlation in order to make a final decision on phenotype classification.

The disclosed processes and methods are not limited to analyzing analytical gels or blots for a single purpose. For instance, the disclosed processes and methods may be used for the analysis of α1-antitrypsin (A1AT) gel analysis, CK isoenzyme gel analysis, LD isoenzyme gel analysis, ALP isoenzyme gel analysis, Fragile X with reflex to methylation analysis, acetylcholinesterase analysis, analysis of urine mucopolysaccharides (Glycosaminoglycans) for the diagnosis of mucopolysaccharidosis, and hemoglobinopathy gel analysis, as well as any other type of gel or blot analysis that would benefit from comparing a sample to a reference database or reference standard. By using the disclosed processes and methods to compare a sample to a reference database or standard, the process of analytical gel or blot analysis can be dramatically simplified and standardized, thus increasing efficiency and eliminating reviewer subjectivity. The disclosed processes and methods improve diagnostic and prognostic accuracy and will assist in phenotypic predictions that have traditionally relied on human interpretation of gel electrophoresis results or the interpretation of other types of analytical gels or blots.

Indeed, the disclosed system and process is designed to assist laboratory technicians and scientists in simplifying phenotype detection from electrophoresis gels and other commonly used analytical gels and blots. The subjective nature of analytical gel/blot interpretation is very time consuming and heavily relies on a subject matter expert, leaving the analysis open to variability and subjectivity based on the experience level of the reviewer. In order to speed up processing and improve accuracy, the present system and process provides a way to quickly analyze gels or blots in an accurate, objective way.

Moreover, the disclosed system stores data to allow for supervised machine learning of the system. The disclosed systems and processes allow for every digitized gel or blot to be stored and incorporated into the reference dataset. In this way, the reference dataset is capable of evolving. Additionally, the system is capable of being trained to recognize specific phenotypic signatures. Accordingly, as more and more of a given type of analysis is performed, the disclosed system will become more accurate in its predictions and correlations. The storage of this data can be on a local or remote server, or can be stored in a cloud format to facilitate accessibility from multiple locations.

The disclosed systems and processes can use reference databases or datasets as a basis for the prediction and decision-making processes. The accuracy of phenotype prediction can be dependent, at least in part, upon the availability of a matching reference signal within the reference database. Accordingly, the introduction into reference database of new signature signals that are associated with a given phenotype should further increase the accuracy and predictability of the output. Each time a new phenotype is added to a reference database, the disclosed system learns to associate the phenotype to the signal signature in order to make future predictions. In some implementations, if the system misidentifies a sample, the sample can be flagged and the system can update the machine learning model to correctly identify similar samples in subsequent samples.

While the disclosed systems and processes can quickly and reliably detect widely known phenotypes or common diagnostic/prognostic signatures based on pre-existing datasets, the disclosed systems and processes can also be trained to recognize rare phenotypes and diagnosis. Training the disclosed systems and methods to recognize rare events may initially require manual curation of gels/blots and the input of new data. Manual curation can include, but is not limited to, resetting a dataset to a default setting; altering or modifying an image; scaling, rotating, or magnifying an image; or other manual analysis. This manual curation and subsequent input of data will ultimately lead to an ability of the disclosed systems and methods to recognize rare phenotypes or previously unknown phenotypes and diagnoses. In order to be able to predict a rare phenotype, the disclosed system must be trained with at least one representative signal corresponding to the rare phenotype classified within the reference database. However, more representative signals will increase the accuracy and predictability with respect to the rare phenotype.

The above-described embodiments can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. For example, the image processor 102 can be executed on a computer or specialty logic system that includes one or more processors.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, an intelligent network (IN), or the Internet. Such networks may be based on any suitable technology and may operate according to any suitable protocol and may include wireless networks, wired networks, or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer-readable storage medium (or multiple computer-readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the term "about" and "substantially" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to process data from an analytical gel or blot, comprising:
   (i) a lane detector, executed by one or more processors, to identify a plurality of lanes in a first digital image, wherein the first digital image comprises an analytical gel or blot;
   (ii) a feature generator to determine a lane intensity vector for each of the plurality of lanes in the first digital image, wherein the lane intensity vector passes through the length of the plurality of lanes;
   (iii) a classifier to:
   determine a correlation score for each of the plurality of lanes in the first digital image, wherein the correlation score is based on the lane intensity vector for a respective lane of the plurality of lanes and a reference lane intensity vector; and
   associate a classification to the each of the plurality of lanes in the first digital image based on the correlation score for the respective lane in the first digital image, wherein the classification is a phenotype; and
   (iv) an image preprocessor to convert the digital image into a grayscale image.

2. The system of claim 1, further comprising:
   (v) a drift corrector to normalize the lane intensity vector for each of the plurality of lanes in the first digital image.

3. The system of claim 2, wherein the drift corrector normalizes an intensity value of the lane intensity vector for each of the plurality of lanes in the first digital image.

4. The system of claim 2, wherein the drift corrector normalizes a position of values in the lane intensity vector for each of the plurality of lanes in the first digital image.

5. The system of claim 2, wherein the drift corrector normalizes the lane intensity vector for each of the plurality of lanes in the first digital image with respect to a reference lane.

6. The system of claim 2, wherein the drift corrector normalizes the first digital image.

7. The system of claim 1, wherein the correlation score for each of the plurality of lanes in the first digital image is determined using Pearson correlation.

8. The system of claim 1, wherein
   the classifier adds the lane intensity vector to a reference vector database.

9. A method to process data from an analytical gel or blot, comprising:
   (i) receiving, by an image processor comprising one or more processors, a first digital image comprising an analytical gel or blot;
   (ii) converting, by the image processor, the digital image into a grayscale image;
   (iii) identifying, by the image processor, a plurality of lanes in the first digital image;
   (iv) determining, by the image processor, a lane intensity vector for each of the plurality of lanes in the first digital image, wherein the lane intensity vector passes through the length of the plurality of lanes;
   (v) determining, by the image processor, a correlation score for each of the plurality of lanes in the first digital image, wherein the correlation score is based on the lane intensity vector for a respective lane of the plurality of lanes and a reference lane intensity vector; and
   associating, by the image processor, a classification to the each of the plurality of lanes in the first digital image based on the correlation score for the respective lane in the first digital image, wherein the classification is a phenotype.

10. The method of claim 9, further comprising after step (iv) and before step (v) normalizing, by the image processor, the lane intensity vector for each of the plurality of lanes in the first digital image.

11. The method of claim 10, wherein the image processor normalizes an intensity value of the lane intensity vector for each of the plurality of lanes in the first digital image.

12. The method of claim 10, wherein the image processor normalizes a position of values in the lane intensity vector for each of the plurality of lanes in the first digital image.

13. The method of claim 10, wherein
   the image processor normalizes the lane intensity vector for each of the plurality of lanes in the first digital image with respect to a reference lane.

14. The method of claim 10, wherein the image processor normalizes the first digital image.

15. The method of claim 9, wherein
   the correlation score for each of the plurality of lanes in the first digital image is determined using a Pearson correlation.

16. The method of claim 9, wherein the image processor adds the lane intensity vector to a reference vector database.

\* \* \* \* \*